United States Patent [19]

Salpaka

[11] Patent Number: 5,299,814
[45] Date of Patent: Apr. 5, 1994

[54] TOOL CHUCK HAVING DUST SEAL
[75] Inventor: Glenn L. Salpaka, Salem, S.C.
[73] Assignee: Jacobs Chuck Technology Corporation, Wilmington, Del.
[21] Appl. No.: 45,557
[22] Filed: Apr. 9, 1993
[51] Int. Cl.⁵ .............................................. B23B 31/02
[52] U.S. Cl. ...................................... 279/157; 279/60; 277/53
[58] Field of Search ................. 279/43.9, 46.9, 60-65, 279/133, 157; 277/53

[56] References Cited

U.S. PATENT DOCUMENTS

| | | | |
|---|---|---|---|
| 2,276,499 | 3/1942 | Loeding | 277/227 X |
| 4,575,108 | 3/1986 | Whitehead | 279/59 |
| 4,664,394 | 5/1987 | Theissig et al. | 279/157 |
| 4,695,066 | 9/1987 | Rohm | 279/62 |
| 5,135,241 | 8/1992 | Huff et al. | 279/142 |

*Primary Examiner*—Steven C. Bishop
*Attorney, Agent, or Firm*—Nicola A. Pisano

[57] ABSTRACT

A tool chuck is provided for rotary power tools that includes a dust seal for reducing the quantity of dust and cuttings entering the chuck mechanism. The tool chuck features an endcap affixed to the chuck body and a circular brush may be either permanently or removably engaged to the endcap. The circular brush comprises a multiplicity of either metallic or plastic bristles that contact the shank of a tool bit engaged in the tool chuck.

9 Claims, 3 Drawing Sheets

TOOL CHUCK HAVING DUST SEAL

The present invention relates to the field of tool chucks used in rotary power tools, and particularly, to an improved structure for reducing the ingress of dust and cuttings into the tool chuck.

BACKGROUND OF THE INVENTION

A variety of devices are known for use in the chucks of rotary power tools, such as hand held electric drills, to reduce the ingress of dust and cuttings from into the chuck mechanism. Elastomeric caps have been described for use at the bit receiving portion of a chuck barrel as dust guards to keep cuttings out of the chuck mechanism, as in Thessig et. al. U.S. Pat. No. 4,664,394, for the purposes of gripping the bit, as in Whitehead U.S. Pat. No. 4,575,108, and for achieving both bit centering and dust protection, Huff et. al. U.S. Pat. 5,135,241.

Such previously known elastomeric caps are subject to damage, for example, by being cut by the sharp edges of cuttings directed against the elastomeric material by the tool bit. Such elastomeric dust seals tend to abrade and wear where they contact the shank of the tool bit during normal use. Also, elastomeric dust seals may become brittle during extended use due to the heat conducted to the dust seal from the bit. Finally, in some cases elastomeric dust seals may be unable to readily conform to the flutes in the bit, and may thus permit dust or cuttings to enter the chuck through those flutes.

It is therefore an object of the present invention to provide a tool chuck having a dust seal constructed of a resilient, high strength material that is less likely to sustain damage from the sharp edges of cuttings emanating from the workpiece.

It is another object of the present invention to provide a tool chuck having a removable dust seal that can be easily replaced during the lifetime of the tool chuck to provide a high degree of protection against the ingress of dust and cuttings into the chuck mechanism.

It is still another object of the present invention to provide a tool chuck having a dust seal that readily conforms to the shape of the tool bit, for example, by extending into the flutes of the tool bit, to thereby enhance the dust-protecting feature of the tool chuck.

SUMMARY OF THE INVENTION

The present invention relates to a tool chuck for use in rotary power tools, such as electric drills and related devices, and includes a high strength resilient dust seal. The tool chuck comprises a chuck body and associated chuck mechanism, and an endcap affixed to the chuck body or equivalent structure, and a circular brush engaged to the endcap. The circular brush may be either permanently or removably engaged to the endcap.

The circular brush comprises a circular ring carrying a multiplicity of bristles, so that the bristles of the circular brush contact the shank of a tool bit engaged in the tool chuck. This arrangement permits the tool chuck to accept unconventional tool shank geometries, for example square or hexagonal, and also allows the bristles to extend into the flutes of the tool bit to further reduce the quantity of dust and cuttings entering the chuck mechanism. The bristles forming the circular brush may be either metallic or plastic, as required for a particular application.

Further advantages of the invention, its nature and various advantages will be more apparent from the accompanying drawings and the following detailed description of the preferred embodiment.

DETAILED DESCRIPTION OF THE PREFERRED EMBODIMENT

Figure 1:
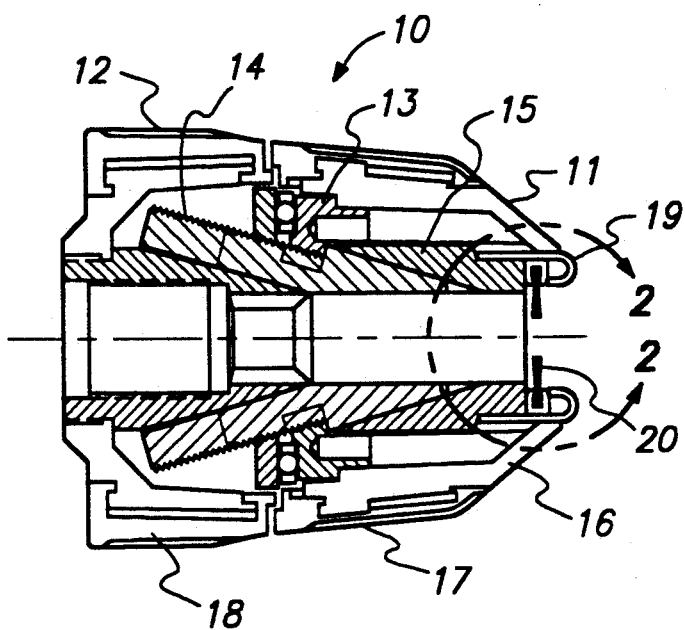
FIG. 1 is a longitudinal sectional view of a tool chuck constructed in accordance with the present invention.

Referring to FIG. 1, a tool chuck embodying the dust seal of the present invention, suitable for use in with a rotary electric drill, is described. The internal mechanism of the chuck of FIG. 1 may be conventional, or such as is described in commonly assigned U.S. Pat. No. 5,145,194, and forms no part of the present invention. FIG. 1 is merely an intended application of the present invention to one type of tool chuck; extension of the present invention to other types of tool chucks is straightforward.

The barrel of chuck 10 of FIG. 1 comprises front sleeve 11 and rear sleeve 12. Chuck 10 is opened and closed by grasping the front and rear sleeves 11, 12, and twisting the sleeves in opposing directions. Such twisting motion causes the threads of nut 13 to turn on the mating threads of jaws 14, thereby extending or retracting jaws 14 into the cavity provided in rear sleeve 12. Chuck body 15 bears against jaws 14 to bring the jaws into contact against a bit when the shank of a bit is disposed therebetween.

Front sleeve 11 comprises drawn cup 16 having elastomeric cover 17 integrally molded with it, as described in U.S. Pat. No. 5,135,241. Rear sleeve 12 also includes integrally molded elastomeric cover 18. In accordance with a first embodiment of the present invention, chuck 10 includes metallic endcap 19 engaging circular brush 20, described in greater detail hereinafter.

Figure 2:
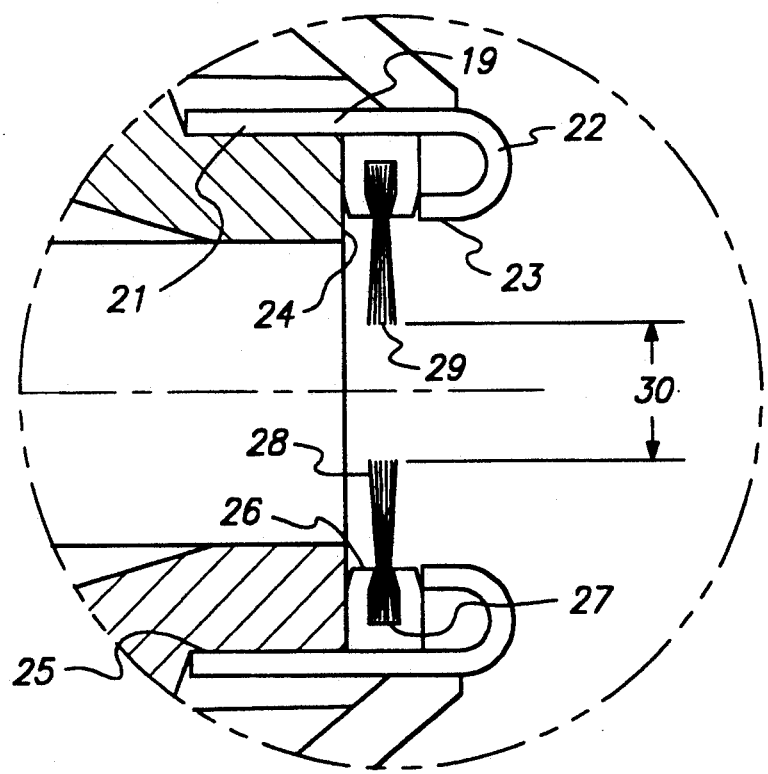
FIG. 2 is an enlarged partial longitudinal sectional view of the dust seal of the present invention.

Referring to FIG. 2, a first embodiment of endcap 19 and circular brush 20 are described. Endcap 19 comprises metallic tube 21 having an inwardly curved portion 22 at its distal end. The inwardly turned end of portion 22 defines flange 23 that captures circular brush 20 against endface 24 of the chuck body 15. Portion 22 extends in the distal direction beyond the distal end of front sleeve 11, to protect elastomeric cover 17 on front sleeve 11 from abrading against the workpiece.

Body 15 of tool chuck 10 includes stepped portion 25 on its exterior surface onto which the proximal end of metallic tube 21 can be press-fit during manufacture. As shown in FIG. 1, movement of jaws 14 in the distal direction (into the central bore of chuck body 15) is constrained so that the distal ends of jaws 14 will not protrude beyond endface 24 of chuck body 15 when jaws are fully extended in the distal direction. This arrangement prevents jaws 14 from interfering with the proper functioning of circular brush 20, as described hereinafter.

Circular brush 20 comprises circular ring 26 having groove 27 in which a multiplicity of bristles 28 are anchored. Multiplicity of bristles 28 extends radially inward so that the free ends 29 of the bristles define an aperture having dimension 30. The center of this aperture is collinear with the longitudinal axis of chuck body 15. Thus, when the shank of a bit is disposed in chuck body 15 and engaged by jaws 14, the shank is disposed in alignment with the longitudinal axis of the chuck body and the free ends 29 of circular brush contact the shank of the bit. This arrangement provides a high degree of dust protection where the tool shank has an unconventional cross-sectional, e.g., square or hexagonal, because the free ends of the circular brush readily conform to the shape of the tool bit. In addition, the free ends may extend into the flutes of the tool bit, thereby further reducing the ingress of dust and cuttings into chuck mechanism.

Further in accordance with the present invention the bristles of circular brush 20 may comprise a high strength resilient material, for example, steel or brass wire, or plastic filament, such as nylon, depending upon the intended specific application of the tool chuck. It will of course be understood by one skilled in the art that the use of a stiffer bristle will reduce the range of shank diameters that can be accommodated by circular brush 20. In addition, as is apparent from FIG. 2, the shank of the tool bit must have a diameter at least equal to dimension 30 of the aperture in circular brush 20 for the dust seal to function properly. Otherwise, dust and cuttings may be admitted to the chuck body through the gap between the free ends 29 of bristles 28 and the tool shank. As described hereinafter with respect to FIGS. 3–5, however, circular brush 30 may be provided with a range of sizes of the central aperture according to the demands of a particular application.

Figure 3:
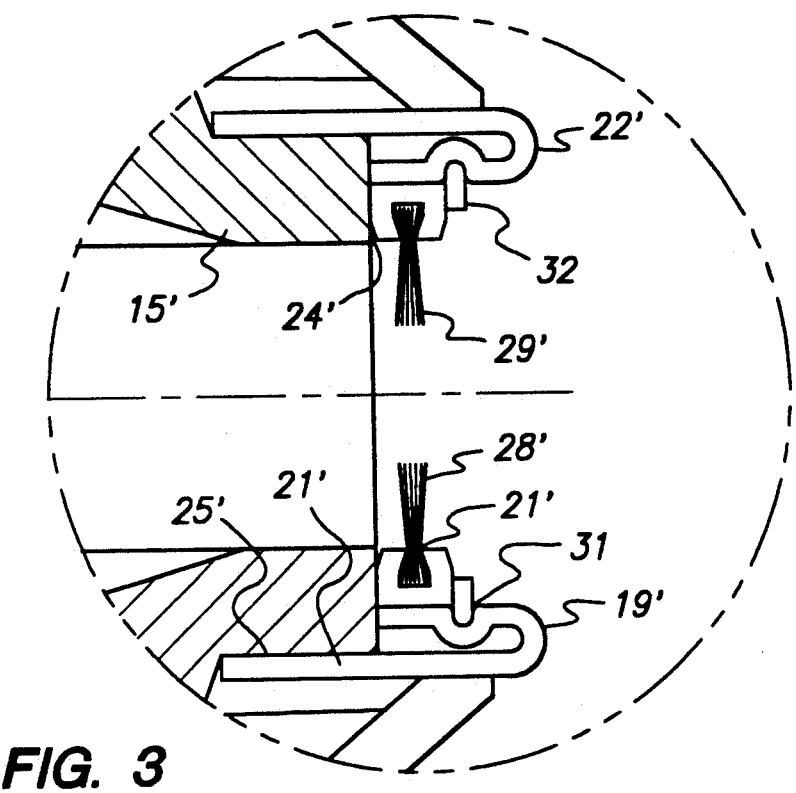
FIG. 3 is an enlarged partial longitudinal sectional view of a replaceable dust seal embodiment of the present invention.
Figure 4:
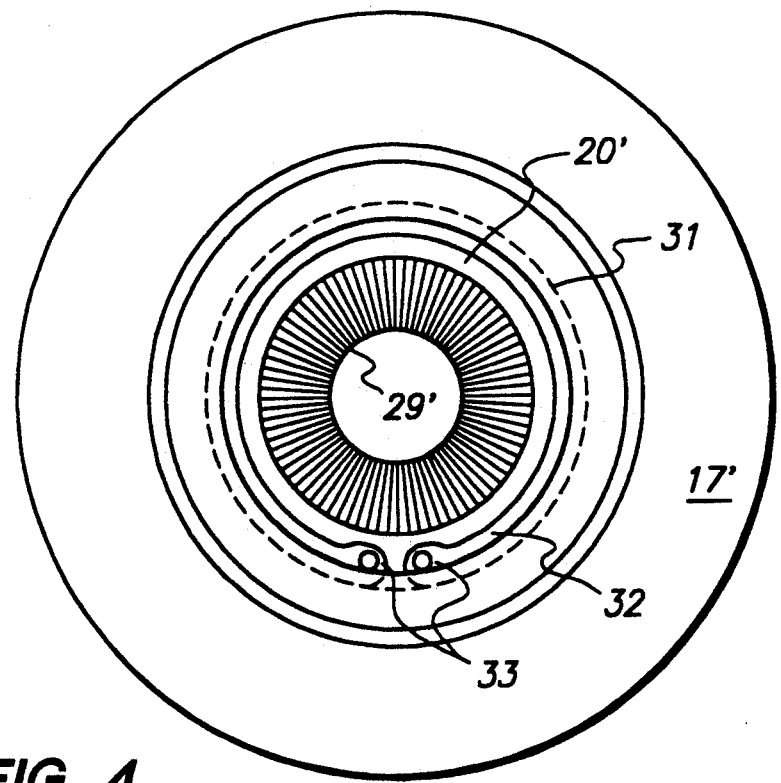
FIG. 4 is a plan view of a tool chuck constructed in accordance with FIG. 3.

Referring now to FIGS. 3 and 4, an alternative embodiment of the present invention is described wherein circular brush 20 is replaceable. In FIG. 3, like parts of the tool chuck of FIG. 2 are denoted in FIG. 3 with like-prime numbers. Thus, for example, chuck body 15 of FIG. 2 is referred to as chuck body 15' of FIG. 3.

In the embodiment of FIG. 3, portion 22' of 20 endcap 19' includes groove 31. Groove 31 extends around the interior surface of endcap 19' and is dimensioned to accept lock ring 32, which captures circular brush 20' against endface 24' of chuck body 15'. Lock ring 31 is best shown in FIG. 4, and includes grasping heads 33 that facilitate grasping lock ring 32 for removal using conventional pliers.

As in the embodiment of FIG. 2, where endcap 19 is permanently affixed to chuck body 15, for example, by press-fitting, in the embodiment of FIG. 3 endcap 19' may also be permanently affixed to stepped portion 25' of chuck body 15'. Unlike the earlier described embodiment, however, the construction of the dust seal of FIG. 3 permits circular brush 20' to be replaced or interchanged. To accomplish this, lock ring 32 is first removed using conventional pliers, and then circular brush 20' is slipped out of endcap 19' and replaced with a new circular brush 20', a circular brush having a different aperture dimension 30, or a different bristle type. Lock ring 31 is then reinstalled to hold the new circular brush 20' in place. Accordingly, the embodiment of FIG. 3 provides a versatile dust seal that can be interchanged for different bit shank diameters and brush materials as best suited for a particular application of the tool chuck.

Figure 5A:
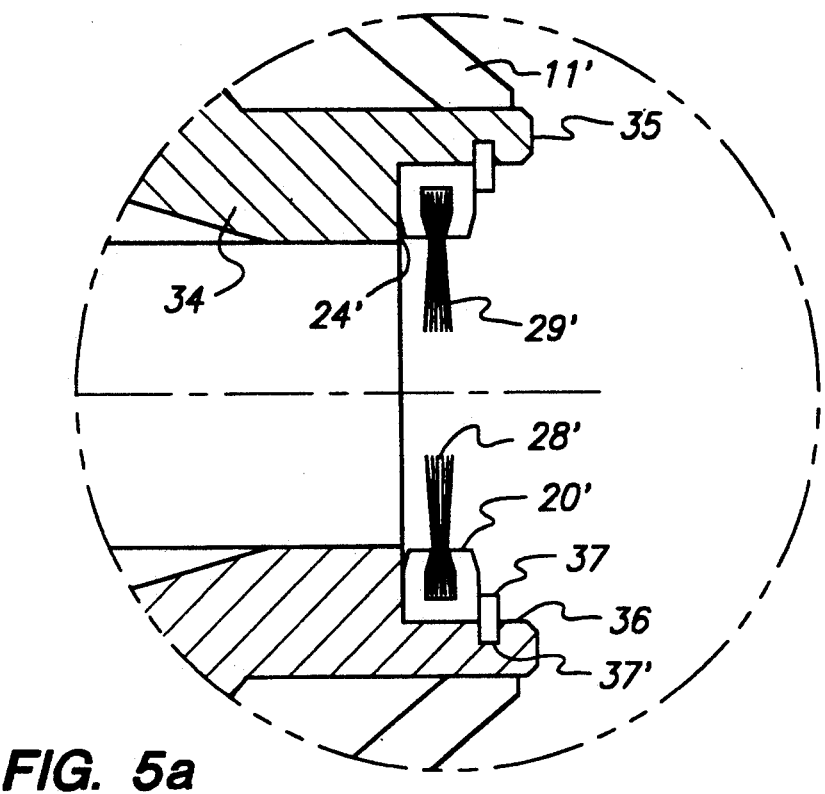
FIGS. 5A and 5B respectively, enlarged partial longitudinal sectional views of alternative embodiments of the replaceable dust seal of FIG. 3.
Figure 5B:
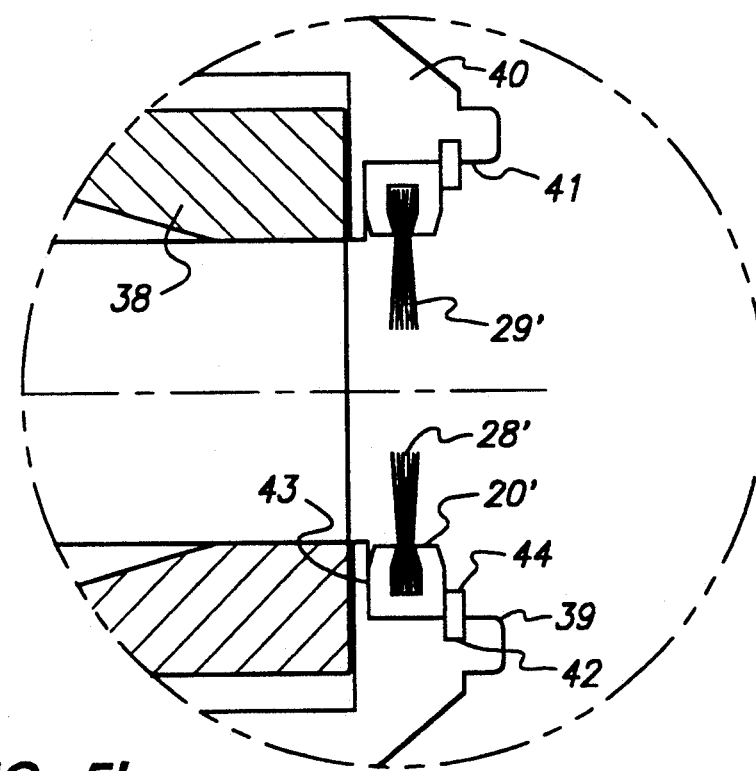

Referring now to FIGS. 5A and 5B, an alternative embodiments of the tool chuck of FIG. 3 are described. FIGS. 5A and 5B are mechanically equivalent to the embodiment of FIG. 3, therefore the plan views of the chucks of FIGS. 5A and 5B appear similar to that of FIG. 4. In addition, features of the embodiments of FIGS. 5A and 5B that are identical to the features of FIG. 3 are illustrated using identical notation.

In FIG. 5A chuck body 15' and endcap 19' are replaced by chuck body 34 having an integrally formed portion 35 that provides structure equivalent to that of endcap 19'. Chuck body 34 includes a distally extending portion 35 that extends in the distal direction beyond the distal end of front sleeve 11' to protect elastomeric cover 17' against abrasion. Chuck body 34 includes stepped bore 36 and circumferential groove 37. Dust guard 20' as hereinbefore described is captured against endface 24' of stepped bore 36. Lock ring 37 is engaged in circumferential groove 37' to retain circular brush 20' in position against endface 24'.

The embodiment of FIG. 5A provides the same advantages as described above with respect to the embodiment of FIG. 3, in that lock ring 37 permits rapid replacement or substitution of circular brush 20' as required to suit a particular application of the tool chuck.

In FIG. 5B chuck body 15' and endcap 19' of FIG. 3 are replaced by chuck body 38 and front sleeve 39 having an integrally formed portion 40 that provides structure equivalent to that of endcap 19'. Portion 40 of front sleeve 39 includes stepped bore 41, circumferential groove 42, and step 43. Step 43 forms a ledge against which circular brush 20' is captured by lock ring 44. Lock ring 44 therefore removably engages circumferential groove 42 to retain circular brush 20' in position against step 43.

As will be readily understood by one skilled in the art, the embodiment of FIG. 5B provides the same advantages as described above with respect to the embodiments of FIGS. 3 and 5A, in that lock ring 44 permits rapid replacement or substitution of circular brush 20' as required to suit a particular application of the tool chuck.

It is to be understood that while specific embodiments of the invention have been shown and described in detail to illustrate the application of the invention principles, the invention is not limited thereto but may be otherwise variously embodied within the scope of the following claims.

What is claimed is:

1. A tool chuck for holding a bit having a shank and a longitudinal axis on a rotary power tool, the tool chuck comprising:
   a chuck body having a first endface and a central bore, the central bore having a longitudinal axis;
   means for engaging the bit in the central bore of the chuck body so that the longitudinal axis of the bit coincides with the longitudinal axis of the chuck body;
   a circular brush comprised of a multiplicity of radially inward extending bristles, the multiplicity of inward extending bristles having free ends that define a circular aperture having a center; and
   means for engaging the circular brush to the tool chuck comprising a tube having an inverted end portion, the inverted end portion defining a flange that captures the circular brush against the first endface so that the center of the aperture is collinear with the longitudinal axis of the central bore and the free ends of the multiplicity of radially inward extending bristles contact the shank of the bit.

2. A tool chuck as defined in claim 1 wherein the multiplicity of bristles is comprised of a metal or metal alloy having high strength and resilience.

3. A tool chuck as defined in claim 1 wherein the multiplicity of bristles comprises a plastic material.

4. A tool chuck for holding a bit having a shank and a longitudinal axis on a rotary power tool, the tool chuck comprising:
- a chuck body having a first endface and a central bore, the central bore having a longitudinal axis;
- means for engaging the bit in the central bore of the chuck body so that the longitudinal axis of the bit coincides with the longitudinal axis of the chuck body;
- a circular brush having a proximal face and distal face, the circular brush comprised of a multiplicity of radially inward extending bristles, the multiplicity of radially inward extending bristles having free ends that define a circular aperture having a center; and
- means for removably engaging the circular brush to the tool chuck comprising a first surface that contacts the proximal face and a second surface that contacts the distal face to capture the circular brush between the first and second surfaces so that the center of the aperture is collinear with the longitudinal axis of the central bore and the free ends of the multiplicity of radially inward extending bristles contact the shank of the bit.

5. A tool chuck as defined as in claim 4 wherein the first surface comprises the first endface and the means for removably engaging the circular brush to the tool chuck further comprises:
- a tube affixed to the chuck body, the tube having an inverted end portion, the inverted end portion having a portion defining a groove, the circular brush disposed within the tube and so that the proximal face of the circular brush contacts the first endface; and
- a lock ring disposed in the groove, the lock ring having a proximal face the comprises the second surface, the proximal face of the lock ring contacting the distal face of the circular brush, whereby the circular brush is removably captured within the tube between the first endface and the lock ring.

6. A tool chuck as defined in claim 4 wherein the first surface comprises the first endface, the tool chuck further comprises a front sleeve, the chuck body further comprises a distal portion defining a stepped bore concentric with the central bore, the step of the stepped bore coinciding with the first endface, a portion of the stepped bore defining a groove, the circular brush disposed within the stepped bore so that the proximal face of the circular brush contacts the first endface, and the means for engaging the circular brush to the tool chuck further comprises a lock ring disposed in the groove, the lock ring having a proximal face the comprises the second surface, the lock ring contacting the distal face of the circular brush, whereby the circular brush is removably captured within the stepped bore between the first endface and the lock ring.

7. A tool chuck as defined in claim 4 wherein the means for engaging the circular brush to the tool chuck further comprises:
- a front sleeve having a distal portion defining a stepped bore concentric with the central bore, the step of the stepped bore defining a ledge, the ledge comprising the first surface, a portion of the stepped bore defining a groove, the circular brush disposed within the stepped bore so that the proximal face of the circular brush contacts the ledge; and
- a lock ring disposed in the groove, the lock ring having a proximal face the comprises the second surface, the lock ring contacting the distal face of the circular brush, whereby the circular brush is removably captured within the stepped bore between the first endface and the lock ring.

8. A tool chuck as defined in claim 4 wherein the multiplicity of bristles is comprised of a metal or metal alloy having high strength and resilience.

9. A tool chuck as defined in claim 4 wherein the multiplicity of bristles comprises a plastic material.

* * * * *

UNITED STATES PATENT AND TRADEMARK OFFICE
CERTIFICATE OF CORRECTION

PATENT NO.  : 5,299,814
DATED       : April 5, 1994
INVENTOR(S) : Glenn L. Salpaka It is certified that error appears in the above-indentified patent and that said Letters Patent is hereby corrected as shown below:

| Column | Line | |
|---|---|---|
| 1 | 12 | delete "from" |
| 2 | 16 | after "5B", insert -- are,-- |
| 3 | 43 | delete "20" |
| 4 | 1 | delete "an" |
| 4 | 60 | after "of", insert --radially-- |
| 5 | 44 | change "the" to --that-- on first occurrence |

UNITED STATES PATENT AND TRADEMARK OFFICE
CERTIFICATE OF CORRECTION

PATENT NO. : 5,299,814
DATED : April 5, 1994
INVENTOR(S) : Glenn L. Salpaka

It is certified that error appears in the above-indentified patent and that said Letters Patent is hereby corrected as shown below:

| Column | Line | |
|---|---|---|
| 6 | 16 | change "the" to --that-- on second occurrence |
| 6 | 34 | change "the" to --that-- on first occurrence |

Signed and Sealed this

Sixth Day of August, 1996

Attest:

BRUCE LEHMAN

Attesting Officer    Commissioner of Patents and Trademarks